United States Patent
Saito et al.

(10) Patent No.: US 7,370,724 B2
(45) Date of Patent: May 13, 2008

(54) MOTOR-DRIVEN STEERING ASSIST APPARATUS

(75) Inventors: Mitsuo Saito, Tochigi (JP); Koichi Hata, Tochigi (JP)

(73) Assignee: Showa Corporation, Saitama (JP)

( * ) Notice: Subject to any disclaimer, the term of this patent is extended or adjusted under 35 U.S.C. 154(b) by 239 days.

(21) Appl. No.: 11/221,673

(22) Filed: Sep. 8, 2005

(65) Prior Publication Data

US 2006/0162990 A1    Jul. 27, 2006

(30) Foreign Application Priority Data

Jan. 25, 2005 (JP) .............................. 2005-017499

(51) Int. Cl.
*B62D 5/04* (2006.01)
(52) U.S. Cl. ..................................... 180/444
(58) Field of Classification Search ................ 180/443, 180/444
See application file for complete search history.

(56) References Cited

U.S. PATENT DOCUMENTS

| 4,593,781 A | * | 6/1986 | Galtier ........................ 180/444 |
| 5,307,894 A | * | 5/1994 | Henein et al. .............. 180/417 |
| 6,006,854 A | | 12/1999 | Nakajima |

FOREIGN PATENT DOCUMENTS

| JP | 2002114164 A | * | 4/2002 |
| JP | 2002331943 A | * | 11/2002 |
| JP | 2003137116 A | * | 5/2003 |

* cited by examiner

*Primary Examiner*—Kevin Hurley
(74) *Attorney, Agent, or Firm*—Orum & Roth LLC

(57) ABSTRACT

A motor-driven steering assist apparatus is structured such that a single unit body covered by housings has an input shaft, an output shaft, a torque sensor, an electric motor and a gear train built-in, and elastic members are interposed between an attaching portion provided in the housing and a vehicle body side attaching stay.

17 Claims, 6 Drawing Sheets

MOTOR-DRIVEN STEERING ASSIST APPARATUS

BACKGROUND OF THE INVENTION

1. Field of the Invention

The present invention relates to a motor-driven steering assist apparatus.

2. Description of the Related Art

In a motor-driven steering assist apparatus of a rough road traveling vehicle, such as a buggy vehicle or the like, as described in Japanese Patent Application Laid-open No. 2004-336565 (patent document 1), there is a structure which is interposed between a steering wheel and a tire wheel side steering member, which assists steering force applied to the steering wheel by a driver on the basis of torque generated by an electric motor.

The motor-driven steering assist apparatus in the patent document 1 has the following elements. A single unit body covered by first to third housings, an input shaft to which a steering wheel is connected, an output shaft to which a wheel side steering member is connected, and a torque sensor which is provided between the input shaft and the output shaft. An electric motor is driven in correspondence to a detected torque of the torque sensor, a worm gear is coupled to a rotary shaft of the electric motor, and a worm wheel is coupled to the output shaft and is engaged with the worm gear built-in. Further, an upper end portion of the input shaft and the torque sensor are supported to the first housing. An upper end portion of the output shaft, the electric motor, the worm gear and the worm wheel are supported to the second housing. A lower end portion of the output shaft is supported to the third housing, and the second housing can be attached to a vehicle body frame (a vehicle body side bracket).

In the motor-driven steering assist apparatus in the patent document 1, an attaching boss provided in the second housing is directly fixed to a support portion of a vehicle body side attaching stay.

There is a risk that vibration from a road surface and an engine when the vehicle travels is transmitted to the torque sensor within the first housing via the vehicle body side attaching stay through the second housing, whereby the torque sensor produces an improper operation due to the vibration along an axial direction of the input shaft and the output shaft.

SUMMARY OF THE INVENTION

An object of the present invention is to inhibit transmission of vibration from a vehicle body side to a torque sensor, and secure stable steering assist performance, in a motor-driven steering assist apparatus.

The present invention relates to a motor-driven steering assist apparatus interposed between a steering wheel and a wheel side steering member, and assisting a steering force which a driver applies to the steering wheel on the basis of a generating torque of an electric motor. A single unit body covered by a housing has an input shaft to which the steering wheel is connected, an output shaft to which the wheel side steering member is connected, and a torque sensor which is provided between the input shaft and the output shaft, an electric motor is driven in correspondence to a detected torque of the torque sensor, and a gear train transmits rotation of the electric motor to the output shaft built-in. An elastic member is interposed between an attaching portion provided in the housing and a vehicle body side attaching stay.

BRIEF DESCRIPTION OF THE DRAWINGS

The present invention will be more fully understood from the detailed description given below and from the accompanying drawings which should not be taken to be a limitation on the invention, but are for explanation and understanding only. The drawings.

DESCRIPTION OF THE PREFERRED EMBODIMENTS

Figure 1:
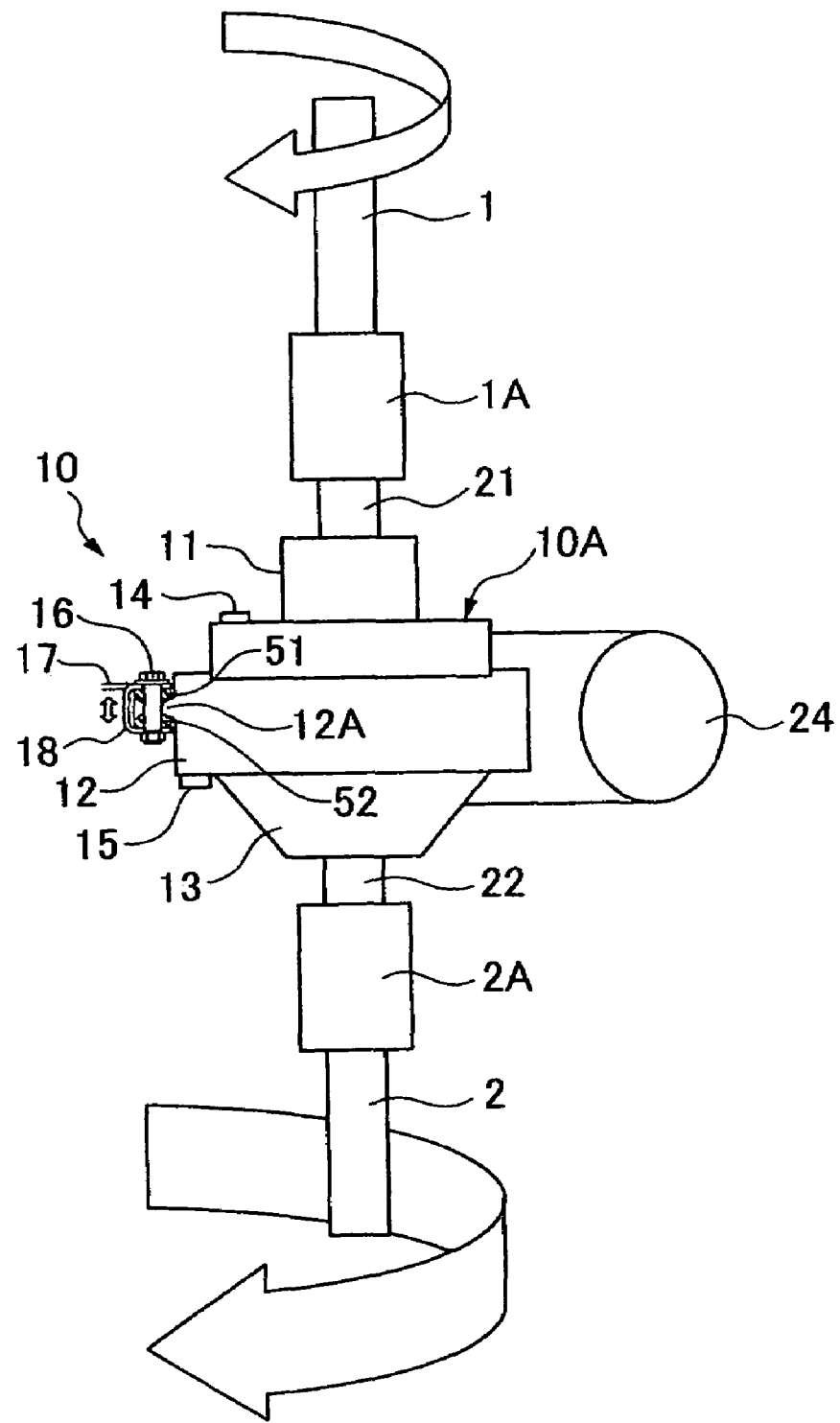
FIG. 1 is an entire schematic view showing a motor-driven steering assist apparatus.
Figure 2:
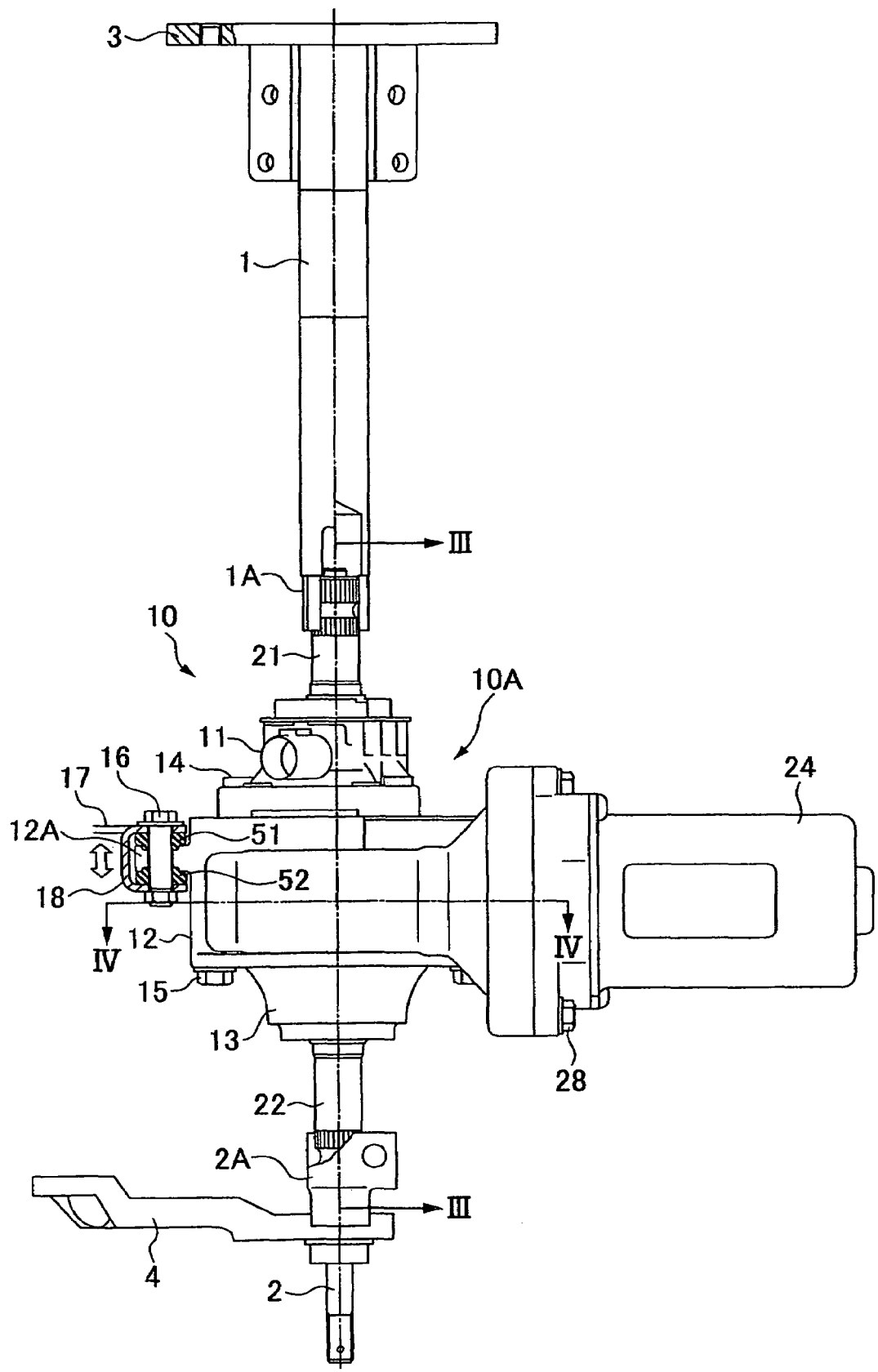
FIG. 2 is a front elevational view showing the motor-driven steering assist apparatus.

A motor-driven steering assist apparatus 10 may be applied to a rough road traveling vehicle, for example, a buggy vehicle, a snowmobile and the like. The apparatus is interposed between a steering wheel side steering member 1 and a tire wheel side steering member 2, as shown in FIGS. 1 and 2, and assists steering force applied to the steering wheel by a driver on the basis of a generated torque of an electric motor 24. A steering wheel attaching member 3 is fixed to the steering wheel side steering member 1, and a pitman arm 4 is fixed to the wheel side steering member 2. The pitman arm 4 is coupled to a front wheel via right and left tie rods.

The motor-driven steering assist apparatus 10 is structured by a single unit body 10A covered by first housing 11 (upper housing or upper cover), second housing 12 (main housing), and third housing (lower housing or lower cover) 13, as shown in FIGS. 1 to 4. The unit body 10A has an input shaft 21, an output shaft 22, a torque sensor 23, an electric motor 24, a worm gear 25 and a worm wheel 26 built-in.

The motor-driven steering assist apparatus 10 is structured such that an upper end portion of the input shaft 21 to which the steering wheel side steering member 1 is connected by a connecting device 1A is supported to the first housing 11 (FIG. 3) by the bearing 31.

Figure 3:
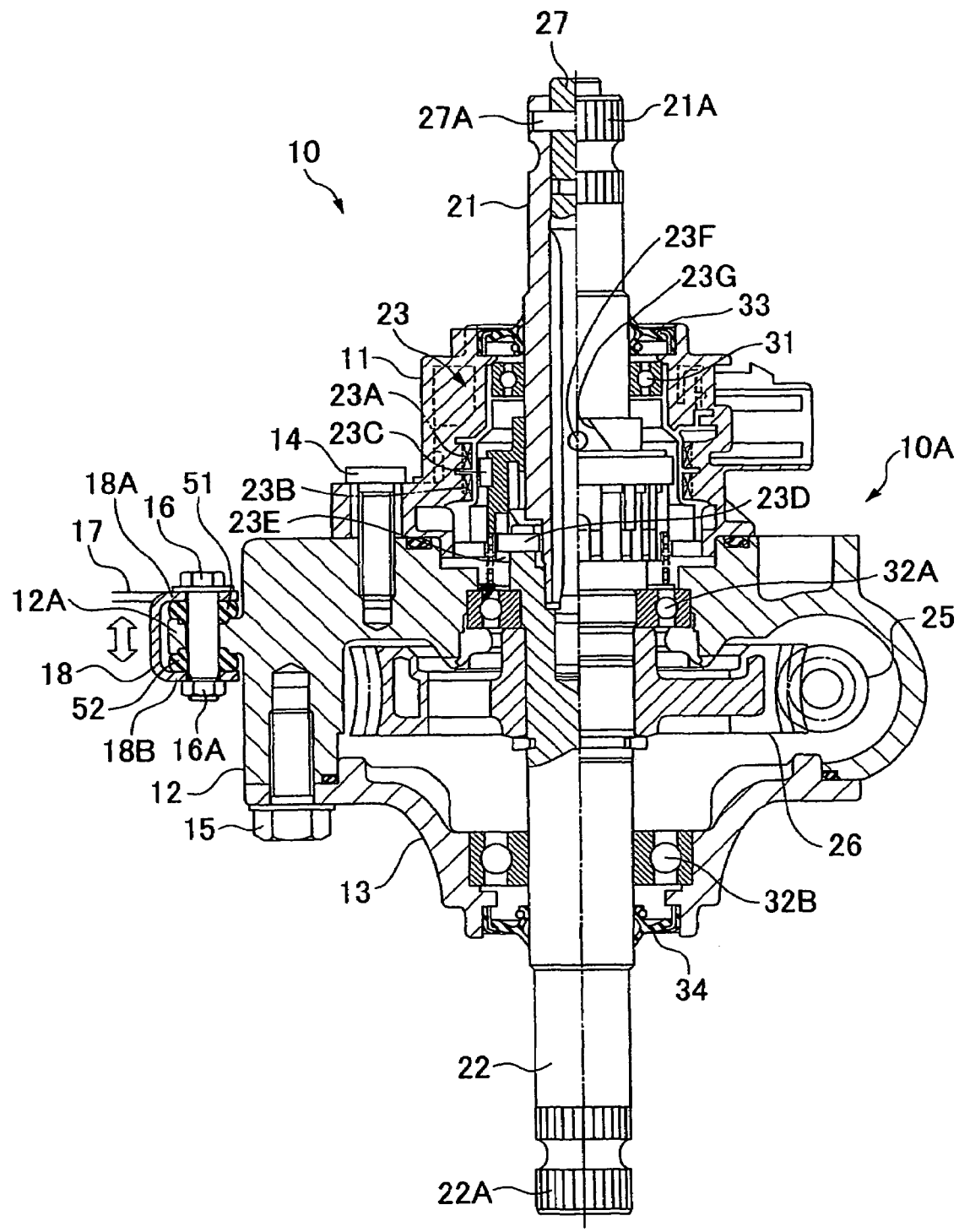
FIG. 3 is a cross sectional view along a line III-III in FIG. 2.

Upper and lower end portions of the output shaft 22 to which the tire wheel side steering member 2 is connected by a connecting device 2A are supported to the second housing 12 and the third housing 13 by upper and lower bearings 32A and 32B (FIG. 3). The input shaft 21 is provided with a serration 21A for connected to the connecting device 1A in an upper end outer peripheral portion. The output shaft 22 is provided with a serration 22A for connecting to the connecting device 2A in a lower end outer peripheral portion. A torsion bar 27 is inserted to a hollow portion of the input shaft 21. One end of the torsion bar 27 is coupled to the input shaft 21 by a coupling pin 27A, and the other end of the torsion bar 27 is inserted to a hollow portion of the output shaft 22 so as to be connected by serration.

A torque sensor 23 is provided with two detecting coils 23A and 23B surrounding a cylindrical core 23C engaged with the input shaft 21 and the output shaft 22, in the first housing 11, as shown in FIG. 3. The core 23C is provided with a vertical groove 23E engaging with a guide pin 23D of the output shaft 22 so as to be movable only in an axial direction, and is provided with a spiral groove 23G engaging with a slider pin 23F of the input shaft 21. Accordingly, when a steering torque applied to the steering wheel is applied to the input shaft 21, and a relative displacement in a rotation direction is generated between the input shaft 21 and the output shaft 22 on the basis of an elastic torsional deformation of the torsion bar 27, the displacement in the rotation direction of the input shaft 21 and the output shaft 22 displaces the core 23C in an axial direction. An inductance of the detecting coils 23A and 23B caused by a magnetic change around the detecting coils 23A and 23B due to the displacement of the core 23C is changed. When the core 23C moves close to the input shaft 21, the inductance of the detecting coil 23A to which the core 23C moves close is increased, and the inductance of the detecting coil 23B from which the core 23C moves apart is reduced, whereby it is possible to detect the steering torque on the basis of the change of the inductance.

Figure 4:
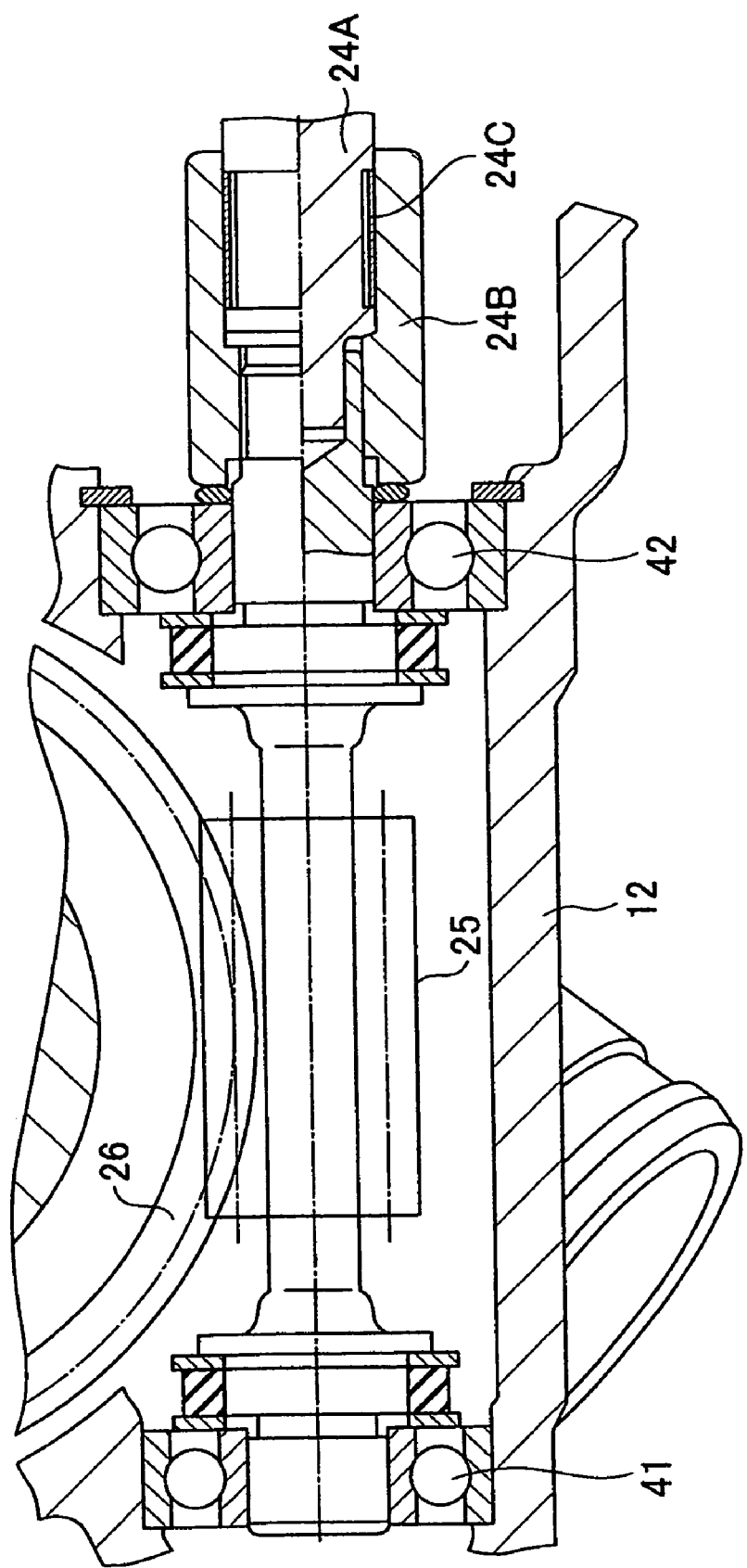
FIG. 4 is a cross sectional view along a line IV-IV in FIG. 2.
Figure 5:
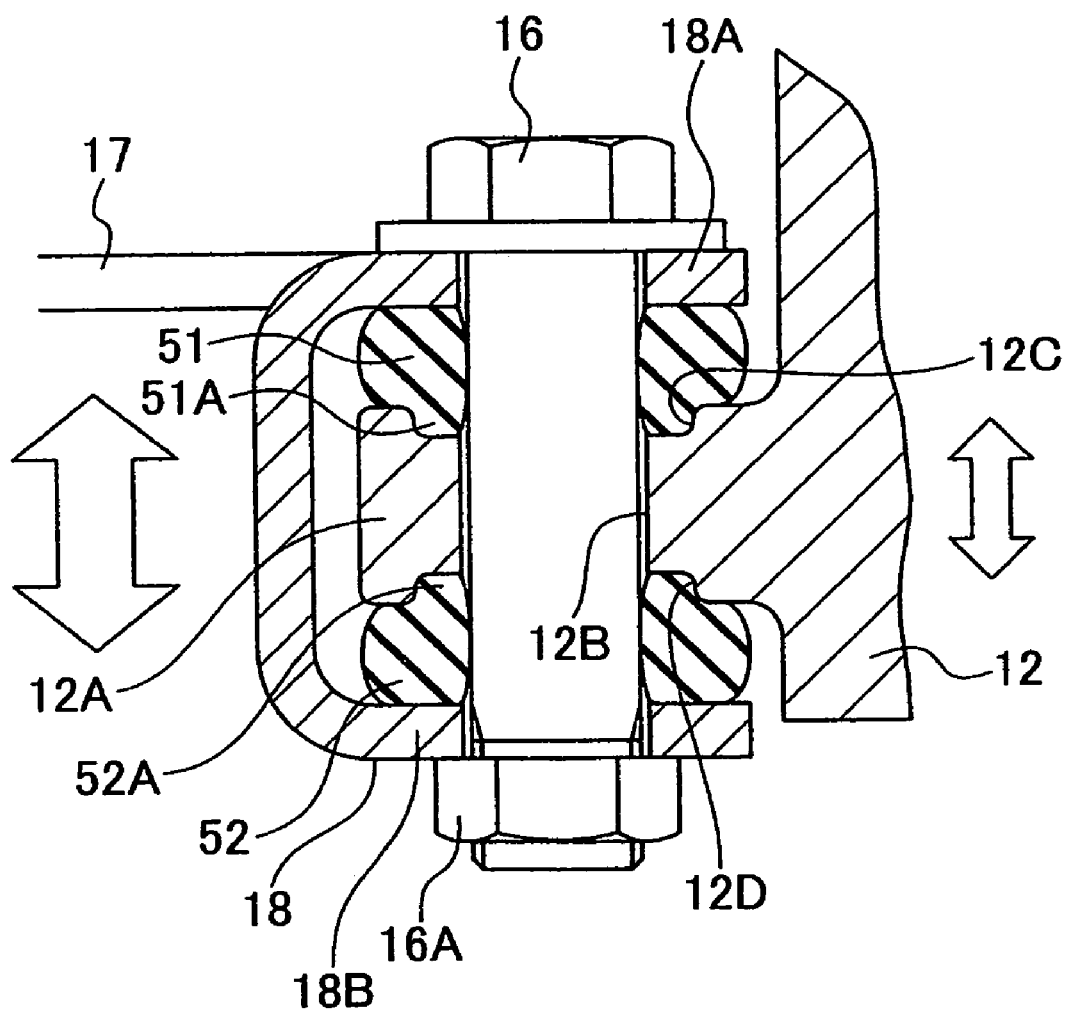
FIG. 5 is a cross sectional view showing an attaching structure of a housing.
Figure 6:
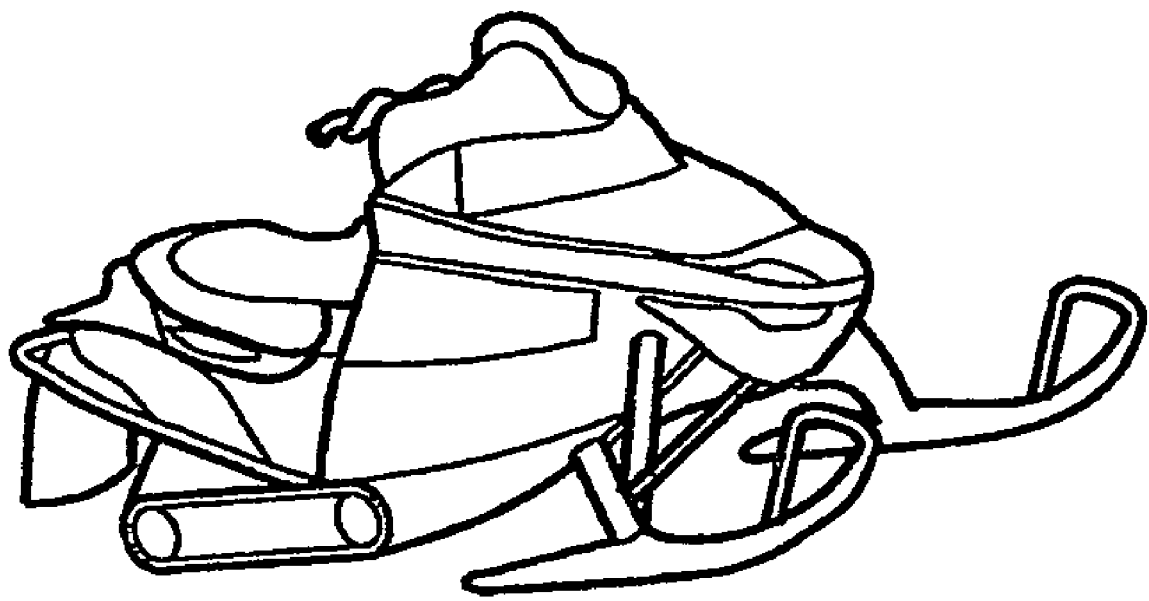
FIG. 6 is a view showing a snowmobile.

The electric motor 24 is attached and supported to the second housing 12 by a mounting bolt 28, and is driven by a controller, not shown, in correspondence to the detected torque of the torque sensor 23. A worm gear 25 is coupled to a rotation shaft 24A of the electric motor 24 by a joint 24B, and the worm wheel 26 engaging with the worm gear 25 is fixed to the output shaft 22. The worm gear 25 is supported at both ends to the second housing 12 by right and left bearings 41 and 42, as shown in FIG. 4. The worm wheel 26 is fixed to the output shaft 22 just below an upper bearing 32A in the output shaft 22, in an inner portion of the second housing 12.

In this case, the joint 24B coupling the rotation shaft 24A of the electric motor 24 and the worm gear 25 is structured such that a torque limiter 24C constituted by an elastic ring is interposed in a fitting gap between both the elements (FIG. 4). The torque limiter 24C maintains coupling of the rotation shaft 24A and the joint 24B under normal using torque conditions of the motor-driven steering assist apparatus 10, allows them to slip under abnormal torque conditions, and does not transmit the torque of the electric motor 24 to a side of the joint 24B.

Accordingly, in the motor-driven steering assist apparatus, an integral unit body 10A is structured by supporting the upper end portion of the input shaft 21 and the torque sensor 23 to the first housing 11. The upper end portion of the output shaft 22, the electric motor 24, the worm gear 25 and the worm wheel 26 are supported by the second housing 12. The lower end portion of the output shaft 22 is supported by the third housing 13. The first housing 11 and the second housing 12 are coupled by the mounting bolt 14, and the second housing 12 and the third housing 13 are coupled by the mounting bolt 15 (FIG. 3). An oil seal 33 is attached in a sealing manner to an upper opening portion of the bearing 31 in the first housing 11, and an oil seal 34 is attached in a sealing manner to a lower opening portion of the bearing 32B in the third housing 13 (FIG. 3).

Further, the motor-driven steering assist apparatus 10 is structured such that the second housing 12 can be attached to the vehicle body side. The motor-driven steering assist apparatus 10 is structured, as shown in FIGS. 1 to 3 and 5, such that elastic members 51 and 52 such as a rubber bush or the like are provided in both sides of attaching bosses 12A provided at a plurality of positions, for example, three positions, in a peripheral direction of an outer periphery of the second housing 12. The attaching bosses 12A are pinched between upper and lower support pieces 18A and 18B of forked support portions 18 provided at a plurality of positions corresponding to the attaching bosses 12A of the vehicle body side attaching stay 17 via the elastic members 51 and 52. The attaching bosses 12A are pinched in a floating fixed state between the upper and lower support pieces 18A and 18B via the elastic members 51 and 52 by an attaching bolt 16 (a nut 16A) inserted to the support pieces 18A and 18B of the forked support portion 18, the elastic members 51 and 52 and the attaching bosses 12A.

The attaching boss 12A of the second housing 12 is provided with annular concave portions 12C and 12D which are coaxial with the attaching hole 12B to which the attaching bolt 16 is inserted and attached in both upper and lower surfaces provided with the elastic members 51 and 52. Compression deforms annular convex portions 51A and 52A provided in one surface side (a side which is not in contact with the support pieces 18A and 18B) of the elastic members 51 and 52 pressure pinched between the upper and lower support pieces 18A and 18B of the forked support portion 18 attached to the forked support portion 18 of the vehicle body side attaching stay 17, toward the annular concave portions 12C and 12D with no gap. This structure reduces rotational play of the motor-driven steering assist apparatus 10.

In this case, the attaching boss 12A of the second housing 12 is attached to the forked support portion 18 of the vehicle body side attaching stay 17. The elastic members 51 and 52 are in contact with the attaching bosses 12A and the support pieces 18A and 18B in an axial direction, and is in contact with the attaching bolt 16 in a diametrical direction. The attaching hole 12B of the attaching boss 12A makes a clearance with respect to the attaching bolt 16 small so as to further reduce the rotational play of the motor-driven steering assist apparatus 10.

In accordance with the motor-driven steering assist apparatus 10, the steering torque applied to the steering wheel is detected by the torque sensor 23. The electric motor 24 is driven by the detected torque. The torque generated by the electric motor 24 is transmitted to the output shaft 22 via the worm gear 25 and the worm wheel 26.

Accordingly, the generated torque of the electric motor 24 can be used as an assist force with respect to the steering force which the driver applies to the steering wheel.

In accordance with the present embodiment, the following operations and effects can be achieved.

(a) The vibration in the vehicle body side is absorbed by the elastic members 51 and 52 between the vehicle body side attaching stay 17 and the attaching boss 12A of the second housing 12, and is inhibited from being transmitted to the torque sensor 23 within the second housing 12. Accordingly, it is possible to prevent an improper operation of the torque sensor 23 due to the vibration, and it is possible to secure stable steering assist performance.

(b) Since the attaching boss 12A of the second housing 12 is pinched between the forked support portions 18 of the vehicle body side attaching stay 17 via the elastic members 51 and 52, it is possible to securely absorb the vibration in the vehicle body side by the elastic members 51 and 52.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention. In the present invention, the gear train transmitting the rotation of the electric motor to the output shaft is not limited to the structure constituted by the worm gear and the worm wheel.

Further, in the present invention, the structure may be made such that the elastic member is provided in both sides of the support portion of the vehicle body side attaching stay, and the support portion of the vehicle body side attaching stay is pinched between the forked attaching portions provided in the housing via the elastic member.

Further, the present invention is not limited to the structure in which the second housing 12 is attached to the vehicle body side attaching stay, but may employ a structure in which the first housing 11 or the third housing 13 is attached to the vehicle body side attaching stay. The invention may also employ a structure in which the attaching boss to the vehicle body side attaching stay is provided in the upper surface of the first housing 11 or the lower surface of third housing 13. At this time, it is preferable to receive the attaching bosses within a profile of the second housing 12 in a view in an axial direction of the output shaft.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A motor-driven steering assist apparatus interposed between a steering wheel and a wheel side steering member, and assisting a steering force which a driver applies to the steering wheel on the basis of a generating torque of an electric motor, comprising:

a single unit body covered by a housing having an input shaft to which the steering wheel is connected, an output shaft to which the wheel side steering member is connected, a torque sensor which is provided between the input shaft and the output shaft, an electric motor which is driven in correspondence to a detected torque of the torque sensor, and a gear train which transmits a rotation of the electric motor to the output shaft built-in, an elastic member is interposed between an attaching portion provided in the housing and a vehicle body side attaching stay, wherein the elastic member is provided in both sides of the attaching portion provided in the housing, and the attaching portion provided in the housing is pinched between forked support portions of the vehicle body side attaching stay via the elastic member.

2. A motor-driven steering assist apparatus as claimed in claim 1, wherein the housing is constituted by first to third housings, the first housing supports an upper end portion of the input shaft and the torque sensor,
the second housing supports an upper end portion of the output shaft, the electric motor and the gear train,
the third housing supports a lower end portion of the output shaft, and
the attaching portion is provided in an outer periphery of the second housing.

3. A motor-driven steering assist apparatus as claimed in claim 2, wherein the attaching portion comprises attaching bosses provided at a plurality of positions in a circumferential direction of an outer periphery of the second housing.

4. A motor-driven steering assist apparatus as claimed in of claim 2, wherein the motor-driven steering assist apparatus is applied to a snowmobile.

5. A motor-driven steering assist apparatus as claimed in of claim 2, wherein the motor-driven steering assist apparatus is applied to a snowmobile.

6. A motor-driven steering assist apparatus as claimed in claim 1, wherein the attaching portion has an annular concave portion, and the elastic member is provided with an annular convex portion in one surface side, the forked support portion is provided with upper and lower support pieces, and
wherein in a state in which the elastic member is attached to the forked support portion, the annular convex portion provided in one surface side of the elastic member pinched between the upper and lower support pieces of the forked support portion is fitted to the annular concave portion by being compression deformed with no gap.

7. A motor-driven steering assist apparatus as claimed in of claim 1, wherein the motor-driven steering assist apparatus is applied to a snowmobile.

8. A motor-driven steering assist apparatus as claimed in of claim 1, wherein the motor-driven steering assist apparatus is applied to a snowmobile.

9. A motor-driven steering assist apparatus interposed between a steering wheel and a wheel side steering member, and assisting a steering force which a driver applies to the steering wheel on the basis of a generating torque of an electric motor, comprising:

a single unit body covered by a housing having an input shaft to which the steering wheel is connected, an output shaft to which the wheel side steering member is connected, a torque sensor which is provided between the input shaft and the output shaft, an electric motor which is driven in correspondence to a detected torque of the torque sensor, and a gear train which transmits a rotation of the electric motor to the output shaft built-in, an elastic member is interposed between an attaching portion provided in the housing and a vehicle body side attaching stay, wherein the elastic member is provided in both sides of the support portion of the vehicle body side attaching stay, and the support portion of the vehicle body side attaching stay is pinched between forked attaching portions provided in the housing via the elastic member.

10. A motor-driven steering assist apparatus as claimed in claim 9, wherein the housing is constituted by first to third housings, the first housing supports an upper end portion of the input shaft and the torque sensor,
the second housing supports an upper end portion of the output shaft, the electric motor and the gear train,
the third housing supports a lower end portion of the output shaft, and
the attaching portion is provided in an outer periphery of the second housing.

11. A motor-driven steering assist apparatus as claimed in claim 10, wherein the attaching portion comprises attaching bosses provided at a plurality of positions in a circumferential direction of an outer periphery of the second housing.

12. A motor-driven steering assist apparatus as claimed in of claim 9, wherein the motor-driven steering assist apparatus is applied to a snowmobile.

13. A motor-driven steering assist apparatus as claimed in of claim 9, wherein the motor-driven steering assist apparatus is applied to a snowmobile.

14. A motor-driven steering assist apparatus interposed between a steering wheel and a wheel side steering member, and assisting a steering force which a driver applies to the steering wheel on the basis of a generating torque of an electric motor, comprising:

a single unit body covered by a housing having an input shaft to which the steering wheel is connected, an output shaft to which the wheel side steering member is connected, a torque sensor which is provided between the input shaft and the output shaft, an electric motor which is driven in correspondence to a detected torque of the torque sensor, and a gear train which transmits a rotation of the electric motor to the output shaft built-in, an elastic member is interposed between an attaching portion provided in the housing and a vehicle body side attaching stay, wherein the housing is constituted by first to third housings, the first housing supports an upper end portion of the input shaft and the torque sensor, the second housing supports an upper end portion of the output shaft, the electric motor and the gear train, the third housing supports a lower end portion of the output shaft, and the attaching portion is provided in an outer periphery of the second housing.

15. A motor-driven steering assist apparatus as claimed in claim 14, wherein the attaching portion comprises attaching bosses provided at a plurality of positions in a circumferential direction of an outer periphery of the second housing.

16. A motor-driven steering assist apparatus as claimed in of claim 14, wherein the motor-driven steering assist apparatus is applied to a snowmobile.

17. A motor-driven steering assist apparatus as claimed in of claim 14, wherein the motor-driven steering assist apparatus is applied to a snowmobile.

* * * * *